Dec. 7, 1965     F. E. BUSCHBOM     3,221,904
SILO UNLOADER

Original Filed May 6, 1960     5 Sheets-Sheet 1

INVENTOR.
FLOYD E. BUSCHBOM
BY
ATTORNEYS

Dec. 7, 1965   F. E. BUSCHBOM   3,221,904
SILO UNLOADER

Original Filed May 6, 1960   5 Sheets-Sheet 2

INVENTOR.
FLOYD E. BUSCHBOM
BY
*Moore, White & Burd*
ATTORNEYS

Dec. 7, 1965   F. E. BUSCHBOM   3,221,904
SILO UNLOADER

Original Filed May 6, 1960   5 Sheets-Sheet 3

INVENTOR.
FLOYD E. BUSCHBOM
BY
Moore, White & Burd
ATTORNEYS

Dec. 7, 1965  F. E. BUSCHBOM  3,221,904
SILO UNLOADER

Original Filed May 6, 1960  5 Sheets-Sheet 4

INVENTOR.
FLOYD E. BUSCHBOM
BY
ATTORNEYS

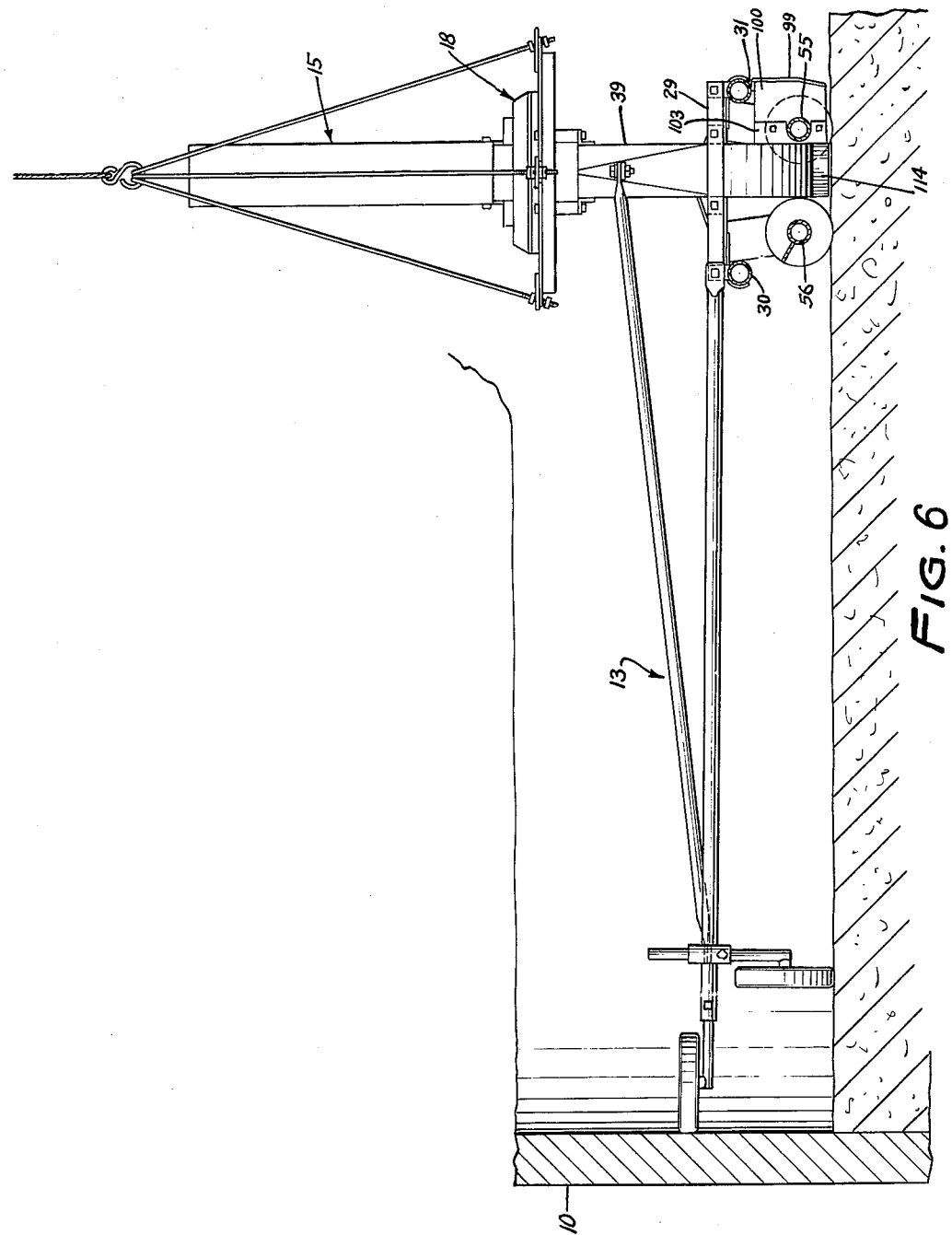

United States Patent Office 3,221,904
Patented Dec. 7, 1965

3,221,904
SILO UNLOADER
Floyd E. Buschbom, Long Lake, Minn., assignor to Vandale Corporation, Long Lake, Minn., a corporation of Minnesota
Continuation of application Ser. No. 27,435, May 6, 1960. This application May 22, 1963, Ser. No. 285,186
9 Claims. (Cl. 214—17)

This application is a continuation of application Serial No. 27,435, filed May 6, 1960, now abandoned.

This invention relates to new and useful improvements in unloaders for silos or the like, as exemplified by top surface unloaders such as shown in Van Dusen Patent No. 2,719,058, and Buschbom Patent Nos. 2,794,560 and 2,877,907.

While great strides have been made in the silo unloader art and an unloader for positioning on the top surface of ensilage within a tower silo and for unloading the ensilage from such silo has now become feasible, as shown in the foregoing Patents Nos. 2,719,058, 2,794,560 and 2,877,907, numerous problems have remained, and improvements have been sought. It is to some of these problems that this invention is directed.

A general object of this invention is to provide a silo unloader having new and improved features.

A further object of this invention resides in the cooperation of the collector arm and closure means with the center impeller housing of a silo unloader.

Still a further object of this invention resides in the specific collector arm structure and its cooperation with the central impeller for efficient feeding of the ensilage into the central impeller.

Still a further object of this invention resides in the provision of the collector arm having new and unique flighting arrangement for cooperation with the silo unloader impeller housing.

Still a further object of this invention resides in new and useful structural improvements in the central impeller structure for providing more efficient material flow.

Yet a further object of this invention resides in the specific structure of the new and useful central impeller rotor.

Yet a further object of this invention resides in the specific configuration of the central impeller housing.

Other and further objects of the invention are those inherent and apparent in the structure as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention will be described with reference to the drawings in which corresponding numerals refer to corresponding parts and in which:

FIGURE 6 is a fragmentary elevational view showing the guide wheel structure of the instant invention.

Figure 1:
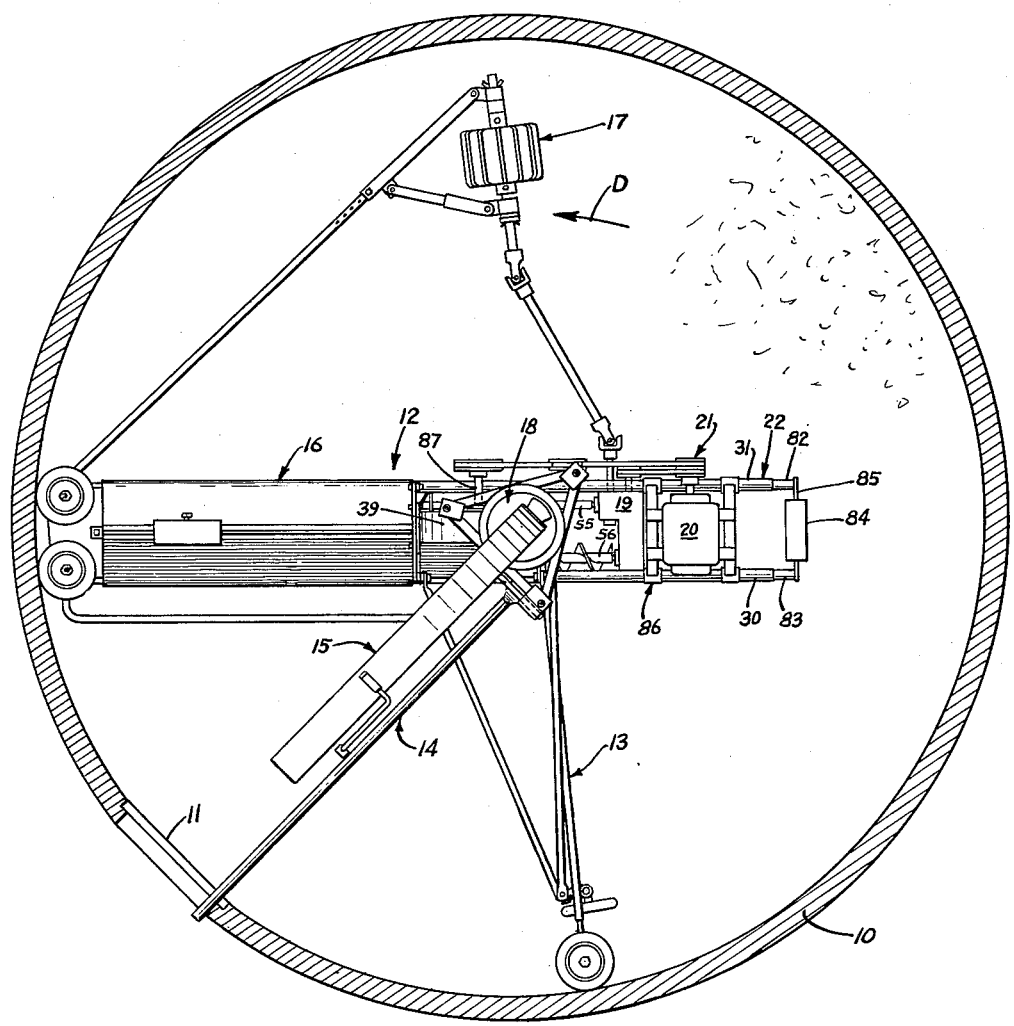
FIGURE 1 is a top plan view of the silo unloader of this invention in position on the top surface of ensilage within a tower silo (shown in horizontal section)

Reference is now made to the drawings, and specifically to FIGURE 1, for the following description. In FIGURE 1, there is shown the confining wall 10 of a conventional tower silo, the wall 10 being constructed of concrete staves, wood or other appropriate material. The wall 10 is usually only of more or less circular configuration, since silos are usually out-of-round. As is well known, the silo is provided with a plurality of vertically aligned apertures, open down to the level of the ensilage and closed below that point. The aligned vertical apertures are separated by cross bars one of which is shown at 11 in FIGURE 1. The silo and unloader cooperate in the manner described in Patents Nos. 2,719,058, 2,794,560 and 2,877,907 and reference is made thereto for more specific details of such background cooperation.

The silo unloader generally designated 12 is shown in plan in FIGURE 1, and includes a guide arm assembly generally designated 13, a torque arm assembly generally designated 14, a chute generally designated 15, a collector arm generally designated 16, a drive hub assembly generally designated 17, a suspension ring assembly 18, and gear box assembly 19, motor 20, drive structure 21 and frame 22.

A front shield 75 is provided of the configuration shown (FIGURE 2) and extends between members 29 and 65, being bolted to these members by downwardly turned ends. It closes the top of the unloader between the impeller housing 39, the frame member 30, and members 29 and 65.

Frame extensions 82 and 83 are adjustably secured to frame members 30 and 31 (by set screws or the like, not shown) and support a counterweight 84 on a cross bar 85 extending therebetween. The motor 20 is mounted on a platform 86, supported on frame members 30 and 31 as shown in FIGURE 1. Through belt drives, as shown, the motor 20 drives the gear mechanism in housing 19 from which the auger shafts 55 and 56 are driven and from which the drive shaft 81 is driven. In such fashion motor 20 also drives the shaft 87 for the central impeller in housing 39.

Figure 3:
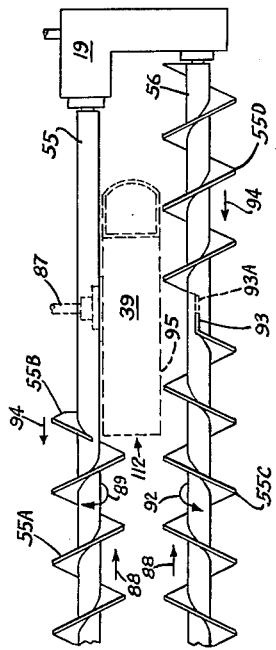
FIGURE 3 is a partial fragmentary plan, partial phantom view illustrating cooperation of the collector arm auger flighting structure with the central impeller.
Figure 5:
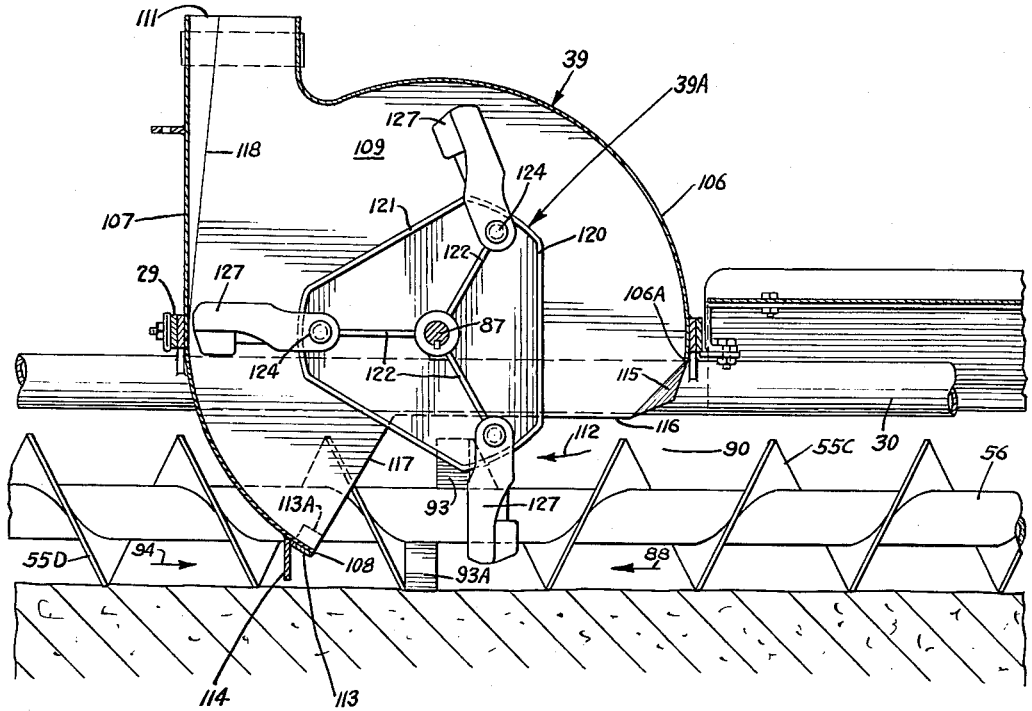
FIGURE 5 is a vertical sectional view taken along the line and in the direction of the arrows 5—5 of FIGURE 4.

As is shown in FIGURE 3, the auger flighting 55A is a righthand flighting when viewed in the direction of the arrow 88, in which direction material is conveyed as the shaft 55 rotates in the direction of the arrow 89. A reverse half flight section 55B is positioned in substantially continuous extension with flight section 55A and in the relation shown with reference to the front entrance 112 of impeller housing 39 as shown in FIGURE 5. This reverse flighting 55B blocks further travel of material in the direction of the arrow 88 adjacent the entrance to the impeller housing so that such material will be conveyed into the impeller at end 112.

The flighting 55C, when viewed in the direction of the arrow 88 is a lefthand flighting and serves to convey material in the direction of the arrow 88 as the shaft 56 rotates in the direction of the arrow 92. A flat straplike extension 93 is provided at the inboard end of flighting 55C, and at an axial position with reference to shaft 56 slightly to the outboard side of the intersecting prolongation of the axis of shaft 87.

Positioned on the opposite side of shaft 56 is a second straplike extension 93A which forms a continuation of the reverse flighting 55D which flighting conveys material in the direction of the arrow 94.

The particular cooperation of the forward and reverse flighting of the augers of the collecting arm, and the cooperation of the straplike members 93 and 93A with impeller housing 39 provides that material will be gathered and brought inwardly by the double augers, precluded from continuing along the rear of the impeller housing by flighting 55B, and brought into the impeller housing at front entrance and through its side entrance 95, flighting 55C serving to bring it inwardly to force it in at 90 and 95, straps 93 and 93A serving additionally to direct material inwardly in a direction axial to impeller shaft 87. Flighting 55D collects material and brings it into communication with blades or straps 93 and 93A to force a stream of material inwardly in a direction axial with shaft 87. Thus, it will be seen that material will enter the impeller housing at entrance 112 and entrance 95 by being urged in that direction through such cooperation.

Welded or otherwise secured to the bottom of frame member 31 by its inturned end 98 is a collector shield 99 which extends the length of auger flighting 55A–B. An end shield 100 is bolted by turned edges 101–102 to shield 99 and to a flange 103 of housing 39. Flange 103 has a cut-out portion to accommodate shaft 55 as shown in FIGURE 7. The central impeller housing 39 comprises a front wrap 106 which terminates at 106A as shown. It also includes a rear wrap 107 terminating at edge 108 which with side plates 109 and 110 form a scroll housing having an outlet 111, a front entrance at 112, and a side entrance at 95. Rear wrap 107 is provided with a strap or plate member 113 having one edge flush with edge 108 and positioned therebeneath. It has upturned ends 113A which are positioned on plates 109 and 110 respectively and welded or otherwise secured thereto. Thus, member 113 serves to reinforce edge 108 and to provide a cutting edge, or dividing edge for the conveyed stream of material. Welded to the wrap 107 behind member 113 is a stop bar 114 extending thereacross which serves to collect ensilage which would otherwise pass therebeyond and retain it for accumulation and entrance into the impeller housing 39.

Figure 4:
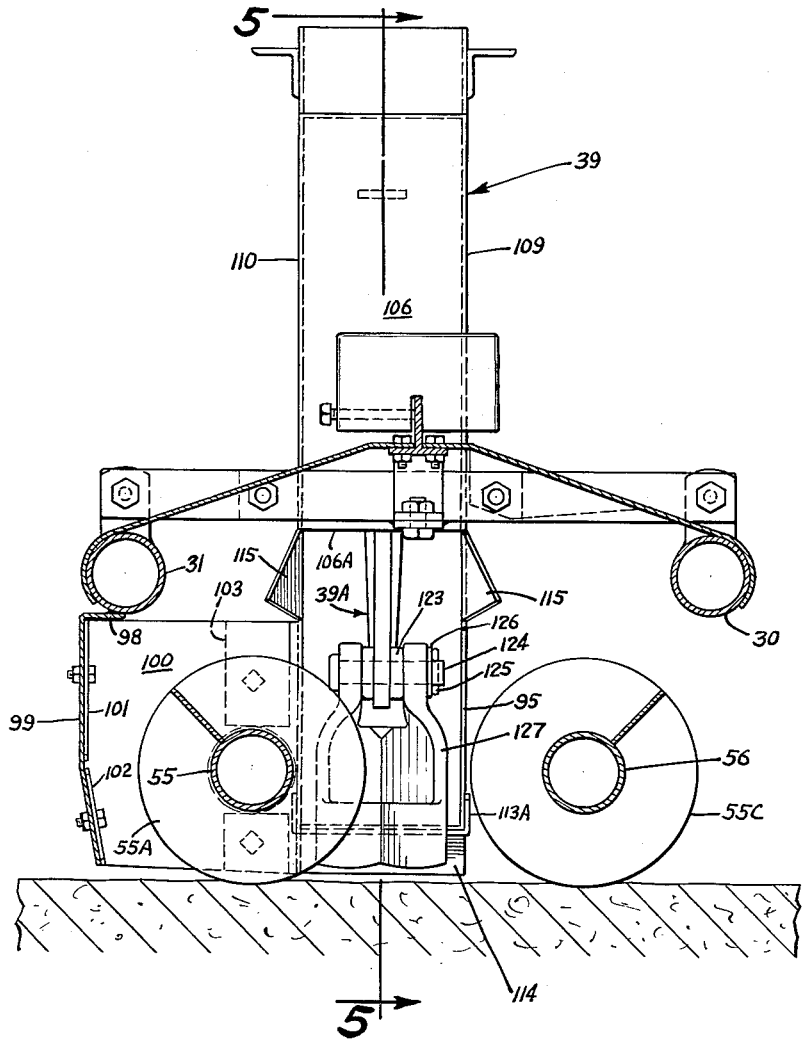
FIGURE 4 is a vertical sectional view on an enlarged scale, taken along the line and in the direction of the arrows 4—4 of FIGURE 2.

Each of the plates 109 and 110 flares outwardly adjacent edge 106A of wrap 106 to form outwardly extending triangular portions 115 as shown in FIGURE 4. While the rear plate 110 has a bottom edge which extends substantially circularly to its junction with portion 103, front plate 109 has a bottom portion removed to edge 116 in a vertical direction and to inclined edge 117 to form an obtuse angle cut-out as shown in FIGURE 5. This is the cut-out forming the side entrance previously designated 95.

Figure 2:
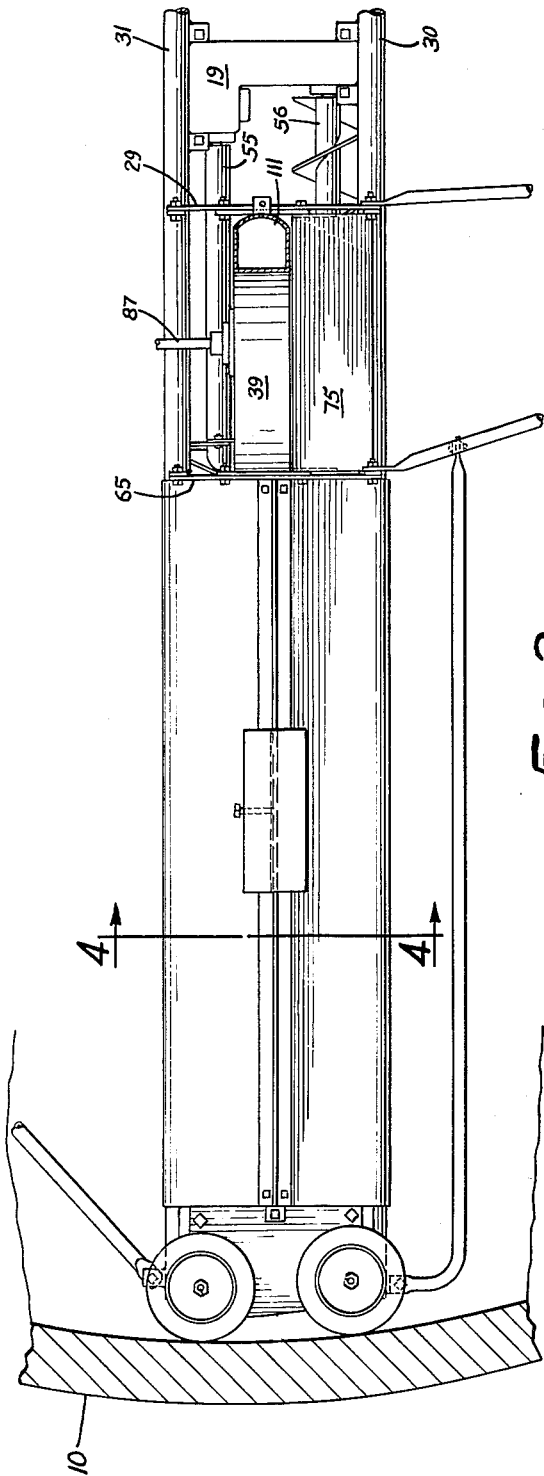
FIGURE 2 is an enlarged fragmentary plan view of the collector arm structure of FIGURE 1.

Starting at portion 117 the rear wrap 107 is progressively rounded and front rear plates 109 and 110 bevelled so that they terminate at edge 118, to which the edges of wrap 107 are joined so that the exit 111 of the housing 39 assumes the rounded configuration shown in FIGURE 2.

The central impeller 39A comprises a central impeller disc 120 of the configuration shown best in FIGURE 5. It is keyed to shaft 87 and is formed from a circular segment with arcuate portions removed so that it assumes the configuration of a triangle with rounded corners as shown in FIGURE 5. It is provided with a peripheral strengthening flange 121 and radial strengthening flanges 122. It is also provided with a plurality of bosses 123 apertured to receive the pins 124 secured in position by cotter keys 125 and serving wih washers 126 to retain the paddles 127 thereon. A plurality of three paddles is provided, each of the configuration shown and described in my application Serial No. 690,934, now Patent No. 2,958,412.

From the foregoing it will be seen that there are provided certain new and useful improvements in silo unloaders designed to accomplish the foregoing objects of this invention.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. In a silo unloader, the improvement comprising an impeller housing substantially in the form of a scroll having side members formed from parallel positioned planar members having parallel integral portions extending therefrom, a first closure member extending from adjacent edges of said integral portions to form rear and bottom closure portions for said impeller housing, a second closure member similarly extended to form front and top closure portions for said impeller housing, said first and second closure members being spaced to provide a circumferential entrance into said housing, said circumferential entrance having a substantially horizontal bottom edge, outwardly extending flange means adjacent the bottom portion of the front and top closure portion for guiding material into said passage, a stop means spaced from said bottom edge means and extended parallel thereto and across said bottom closure portion, and one of said side members having a cut-out along the bottom portion thereof having an edge in the form of an obtuse angle, providing a side entrance into said housing and a first portion of said edge being substantially horizontal and the second portion of said edge being at an obtuse angle with respect thereto.

2. In the silo unloader, the improvement comprising an impeller housing having spaced upright side members, a top member and a rear member secured to the side members, said top and rear members spaced from each other to form a bottom inlet opening and a top outlet opening, said inlet opening having a top edge and a bottom edge providing a circumferential entrance into said housing, outwardly projected flange means adjacent said top edge for guiding material into said inlet opening, downwardly directed stop means secured to said rear member adjacent said bottom edge for guiding material into said inlet opening, one of said side members having a cut-out along the bottom portion thereof having an edge in the form of an obtuse angle providing a side entrance into said housing, said edge having a first portion extended substantially horizontal and a second portion extended downwardly at an obtuse angle with respect to the first portion.

3. In a silo unloader, the improvement comprising an impeller housing substantially in the form of a scroll having side members formed from parallel positioned planar members having parallel integral portions extending therefrom forming an outlet opening, a first closure member extending from adjacent edges of said parallel portions to form rear and bottom closure portions for said impeller housing, a second closure member similarly extended to form front and top closure portions for said impeller housing, said first and second closure members being spaced to provide a circumferential inlet into said housing, said circumferential inlet having a substantially horizontal bottom edge and a circumferentially spaced top edge, one of said side members having a cut-out along the bottom portion thereof having an edge in the form of an obtuse angle providing a side entrance into said housing, said edge having a first portion extended substantially horizontal and a second portion projected downwardly at an obtuse angle with respect to the first portion.

4. In a silo unloader impeller, a scroll-like housing having spaced upright side members, a top member and a rear member secured to the side members, said top and rear members spaced from each other to form a bottom inlet opening and a top outlet opening, said inlet opening having a top edge and a bottom edge, outwardly projected flange means adjacent said top edge for guiding material into said inlet opening, downwardly directed stop means secured to said rear member adjacent said bottom edge and extended substantially parallel thereto for guiding material into said inlet opening, one of said side members having a cut-out along the bottom portion thereof formed by an edge in the shape of an obtuse angle providing a side entrance into said housing, said edge having a first portion substantially horizontal and a second portion directed downwardly at an obtuse angle with respect to the first portion, an impeller member rotatably mounted within said housing, said impeller member comprising a triangular hub member having rounded apices, paddles pivoted to said triangular hub member near each of said apices, and means for rotating said triangular hub member within said housing whereby material is transported from the inlet opening and discharged through the outlet opening.

5. The structure of claim 3 further characterized by an impeller member rotatably mounted within said housing for moving material from the inlet to the outlet, said impeller member comprising, a triangular hub member rotatably mounted within said housing, said triangular hub member having rounded apices, paddles pivoted to said triangular hub member near each of said apices, and means for rotating said triangular hub member within said housing.

6. The structure of claim 5 further characterized by the means for pivotally securing said paddles to said triangular hub member comprising pierced bosses formed near each of said apices, pins extending through said pierced bosses, said paddles having apertures embracing said pins, and stiffening flanges positioned around the periphery and extending from the center of said triangular hub member radially to each of said pierced bosses.

7. The structure of claim 6 in which said peripheral flange is narrower than said bosses axially and said radially extending flanges reduce in axial extension from the center of said hub toward said peripheral flange.

8. The structure of claim 5 wherein the first portion of said edge extends substantially horizontally below the center of said housing and said second portion intersecting with said first portion to form an obtuse angle of less than 150 degrees.

9. In a silo unloader, the improvement comprising a central impeller housing substantially in the form of a scroll having side members formed from parallel positioned planar members substantially in the form of a circle but having parallel integral rectangular portions extending therefrom, a first closure member extending from adjacent edges of said rectangular members to form rear and bottom closure portions for said impeller housing, a second closure member similarly extending to form front and top closure portions for said impeller housing, said first and second members being spaced to provide a circumferential entrance into said housing, said circumferential opening having a substantially horizontal top edge, a substantially horizontal bottom edge spaced therefrom, outwardly extending flange means adjacent said top edge for guiding material into said opening, a reinforcing edge means being positioned to extend underneath said bottom edge means and extending upwardly onto said planar members, a stop means spaced from said last named edge means and extending parallel thereto and across said bottom portion, and one of said circular members having a cut-out along the bottom portion thereof having an edge in the form of an obtuse angle, and a portion of said edge being substantially horizontal and a second portion of said edge being at an obtuse angle with respect thereto.

References Cited by the Examiner
UNITED STATES PATENTS

| | | | |
|---|---|---|---|
| 2,679,788 | 6/1954 | Skardal | 241—194 X |
| 2,794,560 | 6/1957 | Buschbom | 214—17 |

HUGO O. SCHULZ, *Primary Examiner.*